(12) United States Patent
Kuno

(10) Patent No.: US 7,571,891 B2
(45) Date of Patent: Aug. 11, 2009

(54) SOLENOID VALVE

(75) Inventor: Kohei Kuno, Kariya (JP)

(73) Assignee: Denso Corporation, Kariya (JP)

( * ) Notice: Subject to any disclaimer, the term of this patent is extended or adjusted under 35 U.S.C. 154(b) by 272 days.

(21) Appl. No.: 11/513,012

(22) Filed: Aug. 31, 2006

(65) Prior Publication Data

US 2007/0057218 A1 Mar. 15, 2007

(30) Foreign Application Priority Data

Aug. 31, 2005 (JP) ............................. 2005-251332

(51) Int. Cl.
*F16K 31/02* (2006.01)
(52) U.S. Cl. .......................... 251/129.16; 251/129.07
(58) Field of Classification Search ............ 251/129.07, 251/129.15, 129.16
See application file for complete search history.

(56) References Cited

U.S. PATENT DOCUMENTS

| 4,416,423 | A | | 11/1983 | Krauss et al. |
| 4,928,888 | A | | 5/1990 | Ricco |
| 5,372,313 | A | | 12/1994 | Chabon et al. |
| 5,381,965 | A | | 1/1995 | Chabon et al. |
| 5,570,842 | A | * | 11/1996 | Kindley .................... 239/585.1 |
| 5,636,615 | A | | 6/1997 | Shorey et al. |
| 5,820,101 | A | * | 10/1998 | Ricco .................... 251/129.16 |
| 6,027,037 | A | * | 2/2000 | Murakami et al. ............ 239/88 |
| 6,036,460 | A | * | 3/2000 | Christ et al. ................. 417/505 |
| 6,648,248 | B2 | | 11/2003 | Adachi et al. |
| 7,080,819 | B2 | * | 7/2006 | Tojo ....................... 251/129.16 |
| 2005/0139798 | A1 | | 6/2005 | Tojo |

FOREIGN PATENT DOCUMENTS

| EP | 0 054 108 A2 | 6/1982 |
| EP | 0 304 745 A1 | 3/1989 |
| GB | 2 178 483 A | 2/1987 |
| JP | 9-273460 | 10/1997 |
| JP | 2006-322430 A | 11/2006 |
| WO | WO 94/19600 A1 | 9/1994 |

OTHER PUBLICATIONS

Office Action dated May 23, 2008 in CN Application No. 200610128845.4 with English translation.

(Continued)

*Primary Examiner*—John K Fristoe, Jr.
(74) *Attorney, Agent, or Firm*—Nixon & Vanderhye, PC

(57) ABSTRACT

A solenoid valve for a fuel injection valve with an internal space is disclosed. Fuel is included in the internal space. The solenoid valve includes a magnet coil that forms an electromagnet when energized. The solenoid valve also includes a stator that is magnetized by the electromagnet. The solenoid further includes an armature provided in the internal space that is attracted to and moves toward the stator when the stator is magnetized. The armature includes an attracted surface that faces the stator, a second surface that is opposite the attracted surface, a recess provided in the attracted surface, at least one through hole that extends through the armature from the attracted surface to the second surface, and at least one communication groove that establishes communication between the recess and the at least one through hole.

5 Claims, 4 Drawing Sheets

OTHER PUBLICATIONS

Extended European Search Report issued Apr. 11, 2007 in corresponding European Application No. 06119888.3.
Written Opinion mail May 30, 2007 in corresponding European Application No. 06119888.3.
EPC Examination Report dated Sep. 28, 2007 in EPC appln. 06 119888.3.
Examination Report dated Nov. 23, 2007 in CN Application No. 200610128845.4 with English translation.

* cited by examiner

SOLENOID VALVE

CROSS REFERENCE TO RELATED APPLICATION(S)

The following is based on and claims priority to Japanese Patent Application No. 2005-251332, filed Aug. 31, 2005, which is hereby incorporated by reference in its entirety.

FIELD

The present invention relates to a solenoid valve for a fuel injection valve.

BACKGROUND

Efforts are being made to reduce emissions of carbon dioxide ($CO_2$) and otherwise purify auto emissions to thereby reduce harmful environmental effects. With respect to diesel engines, for instance, it has been proposed to increase the pressure of injected fuel, inject fuel in multiple stages, and the like to thereby improve emissions. To achieve these purposes, high response and short injection intervals are typically required of the solenoid valves of injectors.

However, conventional solenoid valves suffer from certain disadvantages. For instance, when a magnet coil is energized and to magnetize a stator, an armature is attracted by the stator and moves in fuel at high speed. The armature in conventional solenoid valve meets with the resistance of the fuel (i.e., fluid drag). The fluid drag has an undesirable effect on response.

In partial response to this problem, U.S. Pat. No. 6,648,248 (Japanese Patent Publication No. 2001-304448) discloses a device with passages that establish communication between a valve chamber filled with fuel and a discharge passage of an injector. The passages are provided around an armature. However, the passages are provided in a component other than the solenoid valve. This complicates the construction of the injector, which leads to an increase in cost.

Another technique has been proposed as illustrated in FIG. 7. As shown, notches 110 are formed in the outer circumferential surface of an armature 100. Communication grooves 130 are also included that establish communication between the notches 110 and a central recess 120 formed in the center of the armature 100. Fluid drag produced when the armature 100 is moved in fuel at high speed is thereby reduced.

However, this technique also suffers from certain disadvantages. Specifically, when the armature 100 is formed of highly magnetic material (e.g. silicon steel) to enhance the solenoid response, the strength of the armature 100 is relatively low. (For example, silicon steel has highly magnetic properties but it is a low-strength material). Also, the armature 100 typically includes relatively thin-walled portions, such as between the notches 110 and the central recess 120. Stress concentrations can develop at these thin-walled portions. Therefore, it may be difficult to form the communication grooves 130 having a sufficient passage area in the thin-walled portions of the armature 100 if it is made out of relatively low-strength magnetic material.

SUMMARY OF THE INVENTION

A solenoid valve for a fuel injection valve with an internal space is disclosed. Fuel is included in the internal space. The solenoid valve includes a magnet coil that forms an electromagnet when energized. The solenoid valve also includes a stator that is magnetized by the electromagnet. The solenoid further includes an armature provided in the internal space that is attracted to and moves toward the stator when the stator is magnetized. The armature includes an attracted surface that faces the stator, a second surface that is opposite the attracted surface, a recess provided in the attracted surface, at least one through hole that extends through the armature from the attracted surface to the second surface, and at least one communication groove that establishes communication between the recess and the at least one through hole.

DETAILED DESCRIPTION OF THE EMBODIMENTS

Figure 1:
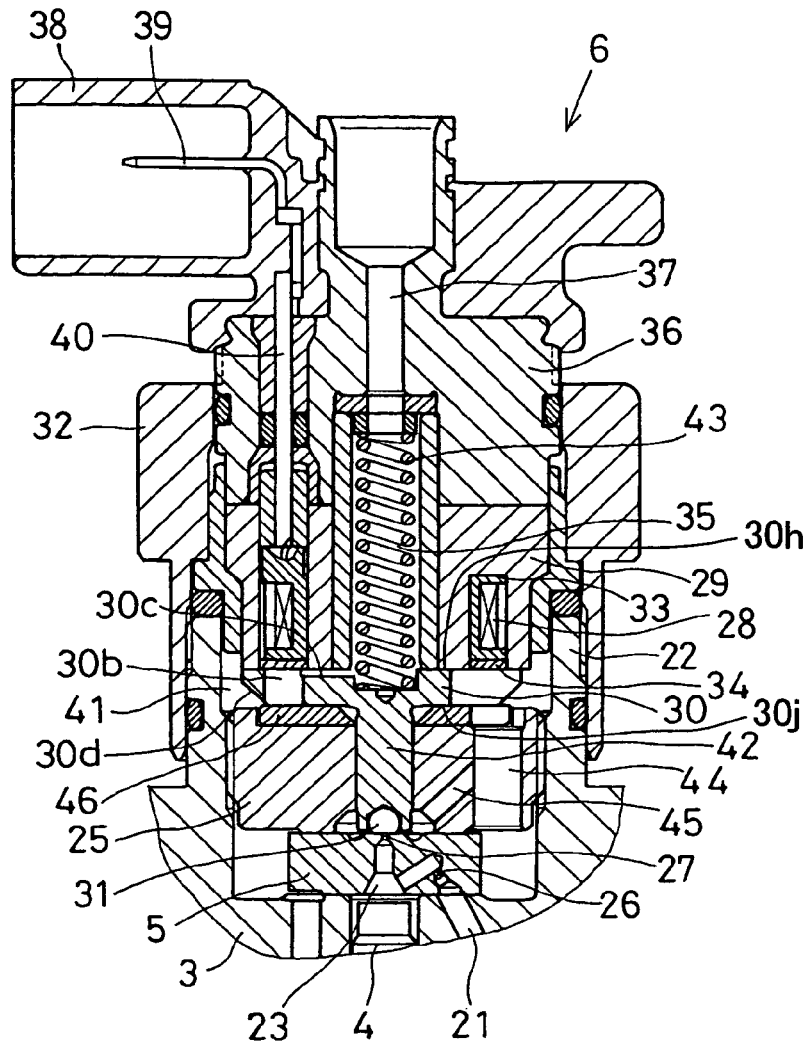
FIG. 1 is a sectional view of one embodiment of a solenoid valve for use in a fuel injection valve.
Figure 2:
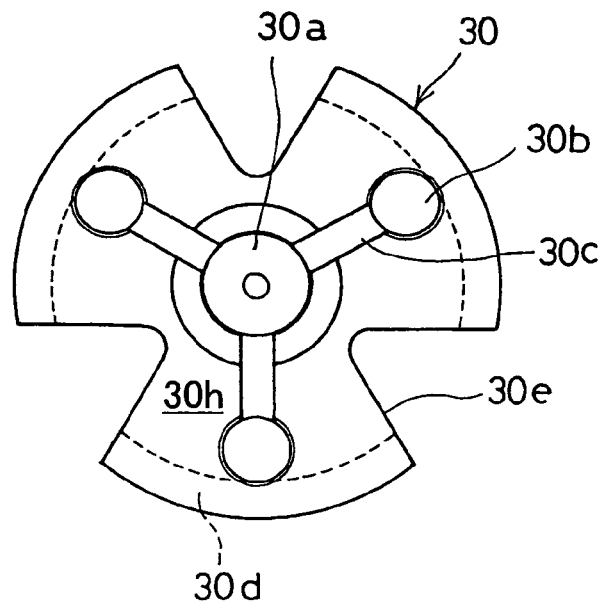
FIG. 2 is a plan view of an armature for use in the solenoid valve of FIG. 1.
Figure 3:
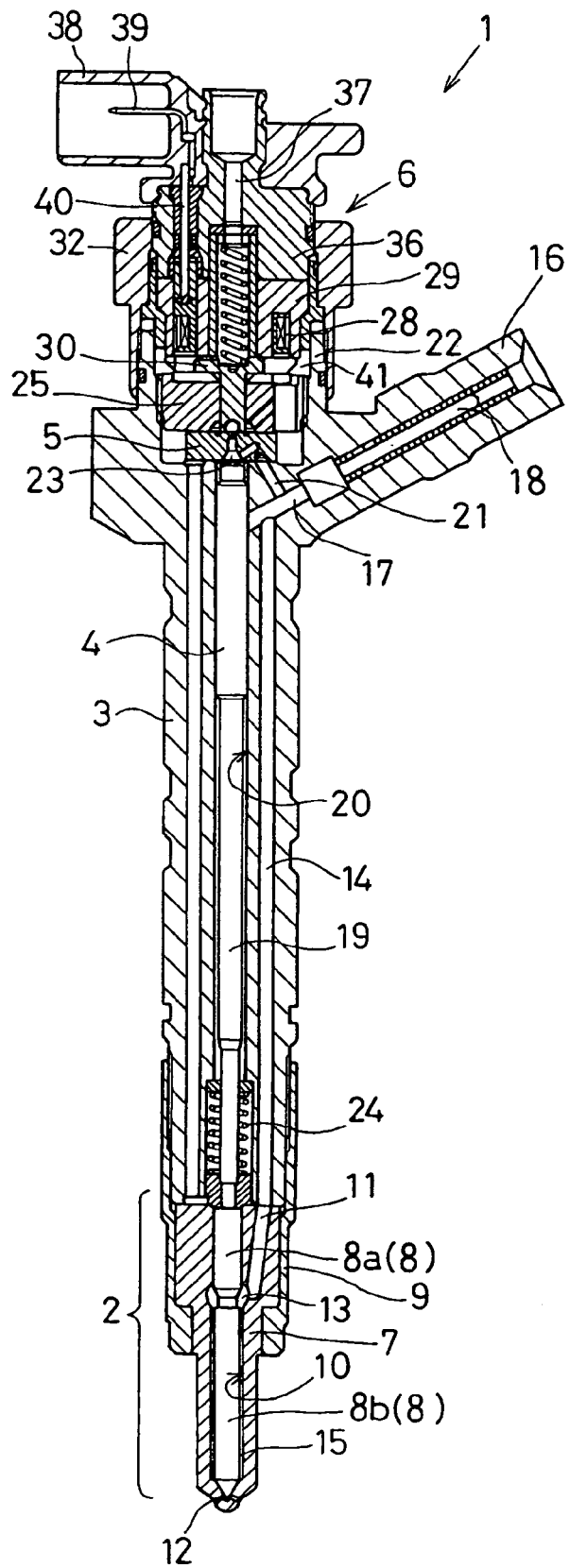
FIG. 3 is a sectional view of a fuel injection valve with the solenoid valve of FIG. 1.

Referring initially to FIGS. 1-3, one embodiment of a solenoid valve 6 for a fuel injection valve 1 is illustrated. In one embodiment, the fuel injection valve 1 is used for a common rail fuel injection system for diesel engines. As illustrated in FIG. 3, the fuel injection valve 1 includes a nozzle 2, a nozzle holder 3, a control piston 4, an orifice plate 5, the solenoid valve 6, and the like.

The nozzle 2 is constructed of a nozzle body 7 and a needle 8 to be described in greater detail below. The nozzle 2 is fixed to the nozzle holder 3 on an end opposite to the solenoid valve 6 (i.e., the lower end in FIG. 3) via a retaining nut 9.

The nozzle body 7 includes a guide hole 10 that houses the needle 8, a fuel passage 11 that guides fuel into the guide hole 10, a nozzle hole 12 through which fuel is injected when the needle 8 is lifted, and the like.

The guide hole 10 is drilled from the upper end face of the nozzle body 7 toward the tip of the nozzle body 7, and a conical seat face is formed at the end of the guide hole 10. A fuel sump 13 where the inside diameter is enlarged is formed at a midpoint in the guide hole 10.

The upstream end of the fuel passage 11 is open at the upper end face of the nozzle body 7 and is in fluid communication with the fuel passage 14 formed in the nozzle holder 3. A downstream end of the fuel passage 11 is in fluid communication with the fuel sump 13.

The needle 8 includes a sliding portion 8a that is slidably disposed in the guide hole 10 above the fuel sump 13 and a shank portion 8b that is disposed in the guide hole 10 beneath the fuel sump 13. A gap is included between the sliding portion 8a and the shank portion 8b. An outer diameter of the shank portion 8b is slightly smaller than that of the sliding portion 8a. Thus, an annular gap is ensured between the inner surface of the guide hole 10 and the outer surface of the shank portion 8b. (This annular gap is referred to as a fuel passage 15.) A seat line is provided at the end of the shank portion 8b, and this seat line can seat on the seat face of the nozzle body 7 and blocks fluid communication between the fuel passage 15 and the nozzle hole 12.

The nozzle holder 3 is provided with a piping joint 16. High-pressure fuel is supplied from a common rail through a fuel pipe (not shown) connected to this piping joint 16. A bar filter 18 for filtering fuel is installed in the internal passage 17 in the piping joint 16.

The nozzle holder 3 includes a cylindrical hole 20 for housing the control piston 4 and a pressure pin 19. The above-mentioned fuel passage 14 is included in the nozzle holder 3 and guides high-pressure fuel from the piping joint 16 to the nozzle 2. The nozzle holder 3 also includes a fuel passage 21 that guides the high-pressure fuel toward the orifice plate 5. A cylindrical wall portion 22 for installing the solenoid valve 6 is provided at the upper end of the nozzle holder 3.

The control piston 4 is slidably disposed in the cylindrical hole 20 in the nozzle holder 3. Oil pressure in a pressure chamber 23, which will be described in greater detail, acts on the upper end face of the control piston 4.

The pressure pin 19 is connected to the lower part of the control piston 4 (i.e., the side opposite the pressure chamber), and the lower end face of the pressure pin 19 is abutted against the upper end face of the needle 8. The pressure pin 19 is moved integrally with the control piston 4. The pressure pin 19 presses the needle 8 toward the valve closing direction (i.e., downward in FIG. 3) due to biasing force from a spring 24 provided around the lower part of the pressure pin 19.

The orifice plate 5 is disposed on the end face in the cylindrical wall portion 22 provided in the nozzle holder 3. The valve body 25 is also disposed in the cylindrical wall portion 22 above the orifice plate 5. The orifice plate 5 is secured by threading and engaging the valve body 25 with the inner circumferential surface of the cylindrical wall portion 22. The orifice plate 5, as illustrated in FIG. 1 includes the pressure chamber 23 that communicates with the cylindrical hole 20 in the nozzle holder 3. The orifice plate 5 also includes an inlet orifice 26 that communicates with the fuel passage 21 formed in the nozzle holder 3 and guides high-pressure fuel into the pressure chamber 23. Furthermore, the orifice plate 5 includes an outlet orifice 27 (i.e., a fuel passage) that discharges high-pressure fuel from the pressure chamber 23 when the solenoid valve 6 is opened.

The solenoid valve 6 includes a magnet coil 28 that forms an electromagnet when energized. The solenoid valve 6 also includes a stator 29 that forms a magnetic circuit around the magnet coil 28. Furthermore, the solenoid valve 6 includes an armature 30 that is moved opposite to the stator 29. Also, the solenoid valve 6 includes a ball valve 31 that is moved with the armature 30 to open and close the outlet orifice 27. The solenoid valve 6 is fixed on the cylindrical wall portion 22 in the nozzle holder 3 via a retaining nut 32.

The magnet coil 28 is wound on a resin bobbin 33 and is provided in the stator 29. The magnet coil 28 is also at least partially encapsulated with resin material 34.

The stator 29 is formed of a ferromagnetic material such as iron. When the magnet coil 28 is energized, the stator 29 is magnetized due to magnetic flux produced. The stator 29 has a center hole 35 that extends axially. The center hole 35 is in fluid communication with the fuel discharge passage 37. The fuel discharge passage 37 is provided in an end housing 36 provided on a side of the stator 29 opposite the armature 30.

A resin connector 38 is installed on the end housing 36. The terminal 39 is provided in the connector 38, and the magnet coil 28 is electrically connected to the terminal 39 via a metal lead terminal 40.

In one embodiment, the armature 30 is formed of a highly magnetic material, such as silicon steel. The armature 30 is provided in the valve chamber 41 defined between the stator 29 and the valve body 25 inside the cylindrical wall portion 22 of the nozzle holder 3. Further, the armature 30 includes a shaft portion 42 that protrudes from a center portion away from the stator 29. The armature 30 includes an attracted surface 30h that faces the stator 29 and a second surface 30j that is opposite to the attracted surface 30h. The shaft portion 42 is slidably provided in a slide hole in the center of the valve body 25.

The valve chamber 41 is filled with fuel, and communicates with the discharge passage 37 through the center hole 35 in the stator 29.

The spring 43 extends through the center hole 35 in the stator 29. The armature 30 is biased away from the stator 29 (i.e., downward in FIG. 1) by the spring 43. When the magnet coil 28 is off, a predetermined gap is maintained between the armature 30 and the stator 29. When the magnet coil 28 is energized and the stator 29 is thereby magnetized, the armature 30 is attracted toward the magnetized stator 29. Then, the armature 30 moves toward the stator 29 to abut against the end face of the stator 29.

A communicating hole 44 is included in the valve body 25 that communicates with the above-mentioned valve chamber 41. An oil passage 45 is also included in the valve body 25 that communicates with the outlet orifice 27 when the ball valve 31 opens the outlet orifice 27. The oil passage 45 is in fluid communication to the side face of the communicating hole 44.

The ball valve 31 is held at the lower end of the shaft portion 42. When the magnet coil 28 is off, the armature 30 is biased by the spring 43 away from the stator 29, and as a result, the ball valve 31 closes the outlet orifice 27 against the oil pressure in the pressure chamber 23. When the magnet coil 28 is energized, the armature 30 is attracted toward the magnetized stator 29, and the ball valve is forced to open the outlet orifice 27 by the oil pressure in the pressure chamber 23. Also, when the magnet coil 28 is off (i.e., when the ball valve 31 has closed the outlet orifice 27), a relatively small gap is maintained between the surface of the armature 30 and the plate 46.

As illustrated in FIG. 2, the armature 30 includes a central recess 30a in the axial center of the attracted surface 30h (i.e., the surface of the armature 30 facing the stator 29 and that is attracted by the magnetized stator 29). The armature 30 also includes a plurality of through holes 30b that extend through the armature 30 from the attracted surface 30h to the second surface 30j of the armature 30. The armature 30 further includes a plurality of communication grooves 30c that extend radially on the attracted surface 30h. The communication grooves 30c establish communication between the central recess 30a and the through holes 30b. A chamfer 30d (e.g., a chamfer of 45 degrees) is formed at the outer edge of the armature 30 on the second side 30j.

The central recess 30a extends axially from the attracted surface 30h of the armature 30 approximately half way through the armature 30 toward the second surface 30j. The central recess 30a of the armature 30 is axially aligned and is in fluid communication with the center hole 35 of the stator 29.

The through holes 30b are spaced equally from each other circumferentially. In the embodiment shown, there are three through holes 30b spaced 120 degrees apart from each other circumferentially. When the armature 30 abuts against the stator 29, the through holes 30b are in fluid communication with the valve chamber 41 through the chamfer 30d of the armature 30. Thus, even when the armature 30 abuts against the stator 29, a fluid passage exists between the valve chamber 41, the chamfer 30d, the through holes 30b, the communication grooves 30c, the central recess 30a, and the center hole 35.

The communication grooves 30c are so formed that they have rectangular shape in a section taken perpendicular to the respective axis. The communication grooves 30c establish fluid communication between the respective through holes 30b and the central recess 30a.

A plurality of notches 30e are also included in the armature 30 between the through holes 30b. The notches 30e extend radially inward from the outer periphery and are substantially V-shaped. In one embodiment, the notches 30e are formed by cutting. The notches 30e are equally spaced circumferentially. In the embodiment shown, there are three notches 30e spaced at intervals of 120 degrees in the circumferential direction.

During operation, when the magnet coil 28 is off, the ball valve 31 closes the outlet orifice 27. Therefore, the needle 8 is biased in the valve closing direction because the oil pressure in the pressure chamber 23 and the force of the spring 24 is greater than oil pressure force that pushes up the needle 8 in the valve opening direction. As a result, the seat line of the needle 8 rests on the seat face to block communication between the fuel passage 15 and the nozzle hole 12, and fuel is not injected.

When the magnet coil 28 is energized and the electromagnet is formed, the armature 30 is attracted toward the magnetized stator 29 and moves toward the stator 29 against the biasing force of the spring 43. As a result, the ball valve 31 opens the outlet orifice 27 due to oil pressure in the pressure chamber 23.

Thus, the oil pressure in the pressure chamber 23 is reduced because fluid passes through the outlet orifice 27. Also, the needle 8 moves toward the opening direction. Then, fuel supplied through the fuel passage 15 is injected from the nozzle hole 12.

When power is cut from the magnet coil 28, the electromagnet stops functioning, the armature 30 is biased away from the stator 29 by the spring 43, and the ball valve 31 closes the outlet orifice 27. Thus, the oil pressure in the pressure chamber 23 rises again. When the force that biases the needle 8 in the valve closing direction thereby exceeds the oil pressure force that pushes up the needle 8 in the valve opening direction, the needle 8 moves toward the closing direction. Thus, the seat line of the needle 8 rests on the seat face to block communication between the fuel passage 15 and the nozzle hole 12, and injection is thereby terminated.

The solenoid valve 6 in this embodiment, used in the fuel injection valve 1 experiences resistance (i.e., fluid drag) due to the armature 30 moving through fuel in the valve chamber 41. As mentioned above, the attracted surface 30h of the armature 30 includes the communication grooves 30c that establish fluid communication between the through holes 30b and the central recess 30a, and the second surface 30j of the armature 30 includes the chamfer 30d on the peripheral edge. The through holes 30b and the valve chamber 41 communicate with each other through the chamfer 30d. As such, fuel can flow between the valve chamber 41 and the center hole 35 in the stator 29 via the through holes 30b. As a result, the armature 30 experiences less fluid drag during movement. Thus response of the solenoid valve 6 is improved.

In one embodiment, the armature 30 is formed of silicon steel, a highly magnetic but relatively low strength material. The armature 30 can have improved response due to the silicon steel, but despite the communication grooves 30c, the armature 30 is less likely to fracture or otherwise fail due to the construction described above. Unlike the prior art, the communication grooves 30c of the present embodiment establish fluid communication between the through holes 30b and the central recess 30a. Thus, when external force (e.g.

impact force produced when the armature collides with the stator 29) is applied to the armature 30, stress concentration is better distributed (i.e., stress concentrations are unlikely to be concentrated on the communication grooves 30c). Therefore, even with an armature 30 made of silicon steel, the passage area (i.e., depth and groove width) of the communication grooves 30c is sufficiently large to reduce fluid drag.

Figure 4:
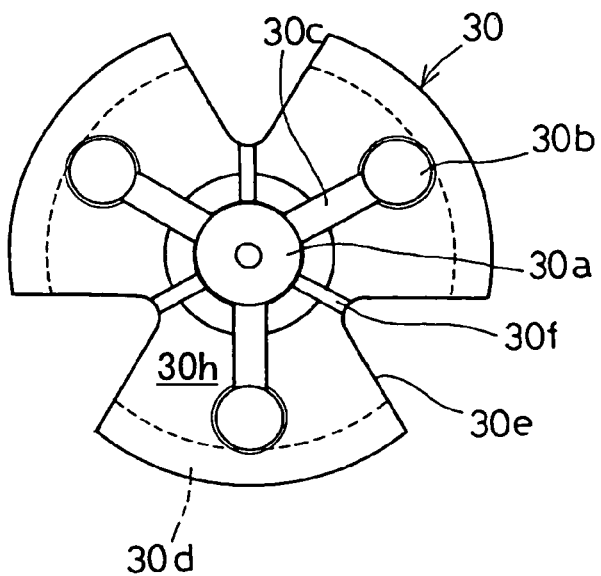
FIG. 4 is a plan view of another embodiment of an armature for use in the solenoid valve.

Referring now to FIG. 4, another embodiment of the armature 30 is illustrated. In this embodiment, the armature 30 includes first communication grooves 30c that establish fluid communication between the central recess 30a and the through holes 30b. The armature 30 in this embodiment also includes second communication grooves 30f formed in the attracted surface 30h. The second communication grooves establish fluid communication between the notches 30e and the central recess 30a in the armature 30.

Thus, in the embodiment of FIG. 4, two systems of passages are formed by forming the second communication grooves 30f. Fuel can flow between the valve chamber 41 and the center hole 35 in the stator 29 through these passages. Therefore, it is possible to further reduce fluid drag produced when the armature 30 moves to thereby obtain more stable response.

The depth, width, and the like of the second communication grooves 30f can be appropriately selected to the extent that required strength can be ensured in the armature 30.

Figure 5:
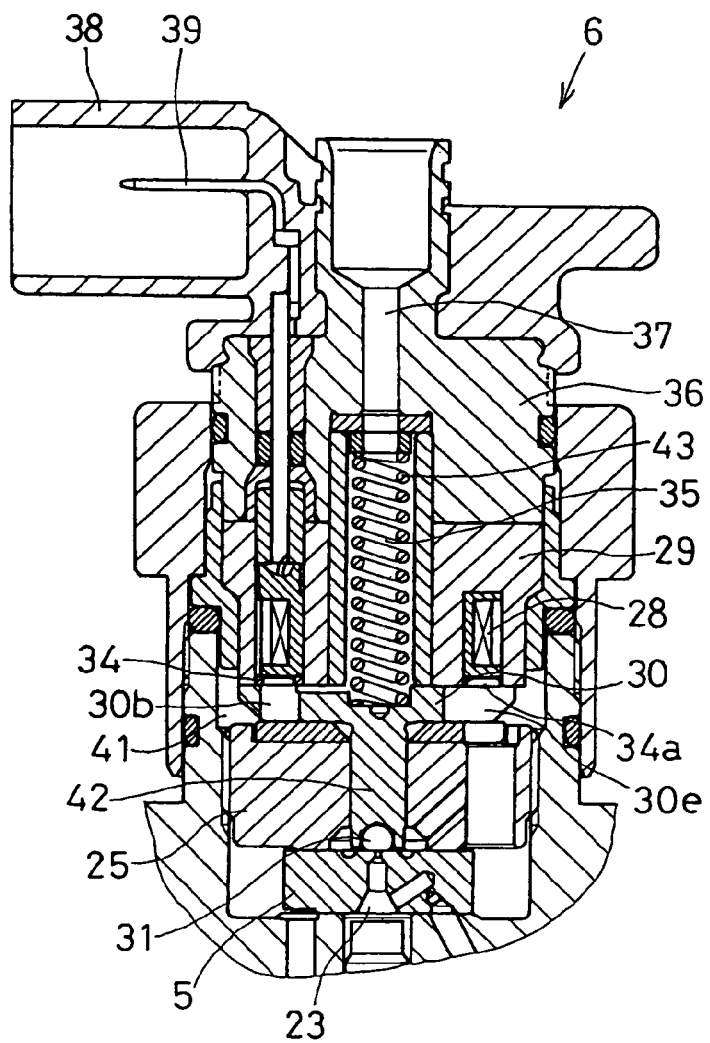
FIG. 5 is a sectional view of another embodiment of a solenoid valve.

Referring now to FIG. 5, another embodiment of the solenoid valve 6 is illustrated. In this embodiment, the solenoid valve 6 includes an annular groove 34a formed in the resin material 34 that encapsulates the magnet coil 28. In this case, the notches 30e and through holes 30b formed in the armature 30 communicate with each other through the annular groove 34a formed in the resin material 34. Therefore, fluid can flow between the valve chamber 41 and the center hole 35 in the stator 29 via the notches 30e as well as the through holes 30b.

Figure 6:
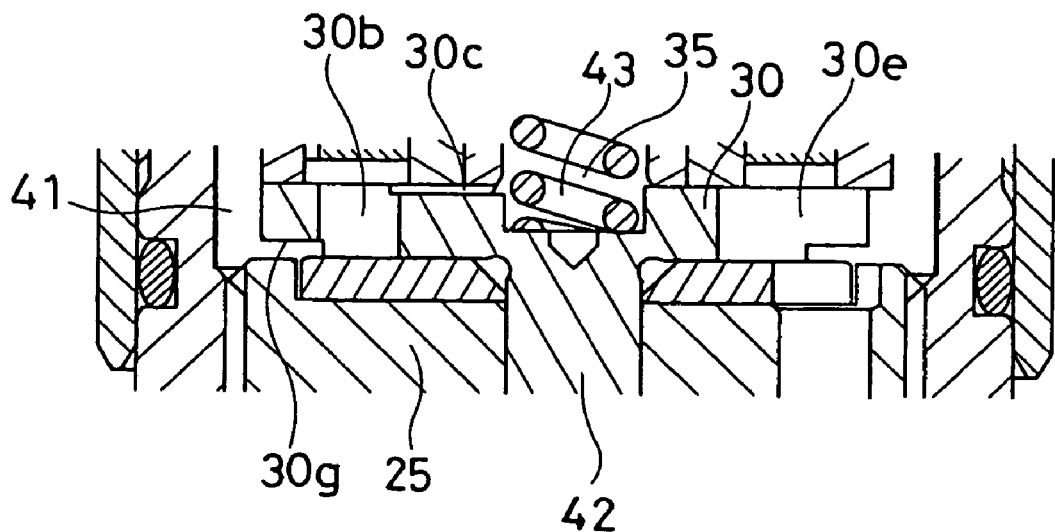
FIG. 6 is a sectional view of another embodiment of an armature for use in a solenoid valve.
Figure 7:
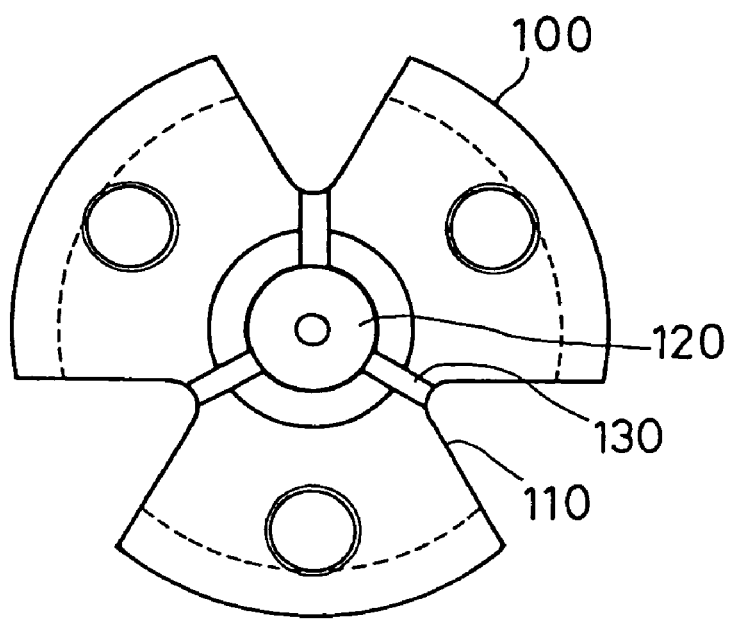
FIG. 7 is a plan view of a conventional armature for use in a solenoid valve.

Referring now to FIG. 6, another embodiment of the armature 30 is shown. In the embodiment shown, the armature 30 includes a step 30g instead of the chamfer 30d described above. Accordingly, in the embodiment shown, the through holes 30b and the valve chamber 41 fluidly communicate with each other through this step 30g.

In the fuel injection valve 1 described in the embodiment of FIGS. 1-3, the fuel discharge passage 37 is provided in the end housing 36 and communicates with the center hole 35 in the stator 29. In another embodiment, the discharge passage 37 is provided in a component other than the end housing 36, for example, in the nozzle holder 3.

While only the selected embodiments have been chosen to illustrate the present invention, it will be apparent to those skilled in the art that various changes and modifications can be made therein without departing from the scope of the disclosure as defined in the appended claims. Furthermore, the foregoing description of the embodiments herein is provided for illustration only, and not for the purpose of limiting the disclosure as defined by the appended claims and their equivalents.

What is claimed is:

1. A solenoid valve for a fuel injection valve with an internal space, wherein fuel is included in the internal space, the solenoid valve comprising:
   a magnet coil that forms an electromagnet when energized;
   a stator that is magnetized by the electromagnet; and
   an armature provided in the internal space that is attracted to and moves toward the stator when the stator is magnetized;
   wherein the armature includes an attracted surface that faces the stator, a second surface that is opposite the attracted surface, a recess provided in the attracted surface, at least one through hole that extends through the armature from the attracted surface to the second surface, and at least one communication groove that establishes communication between the recess and the at least one through hole, wherein the stator includes a hole, and wherein the recess of the armature is in fluid communication with the hole, and wherein the hole included in the stator is in fluid communication with a fuel discharge passage.

2. The solenoid valve according to claim 1, wherein the armature includes a plurality of through holes spaced equally from each other circumferentially.

3. The solenoid valve according to claim 1, wherein the armature further comprises at least one of a chamfer and a step provided on a peripheral edge of the second surface, and wherein the at least one through hole is in fluid communication with the internal space through the at least one of the chamfer and the step.

4. The solenoid valve according to claim 1 wherein the armature is formed of silicon steel.

5. The solenoid valve according to claim 1, wherein the armature further comprises at least one notch extending radially inward from an outer periphery of the armature.

* * * * *